(12) United States Patent
Ing et al.

(10) Patent No.: US 11,554,433 B2
(45) Date of Patent: Jan. 17, 2023

(54) METHODS AND SYSTEMS FOR WIRE ELECTRIC DISCHARGE MACHINING AND VALIDATION OF PARTS

(71) Applicant: PRATT & WHITNEY CANADA CORP., Longueuil (CA)

(72) Inventors: Visal Ing, Sainte-Julie (CA); Ghislain Hardy, Sainte-Julie (CA); Joel Jean, St-Constant (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 587 days.

(21) Appl. No.: 16/585,623

(22) Filed: Sep. 27, 2019

(65) Prior Publication Data

US 2021/0094110 A1    Apr. 1, 2021

(51) Int. Cl.
*B23H 7/20* (2006.01)
*B23H 9/02* (2006.01)
*B23H 7/02* (2006.01)

(52) U.S. Cl.
CPC ............. *B23H 7/20* (2013.01); *B23H 7/02* (2013.01); *B23H 9/02* (2013.01); *B23H 2200/00* (2013.01)

(58) Field of Classification Search
None
See application file for complete search history.

(56) References Cited

U.S. PATENT DOCUMENTS

| | | | | |
|---|---|---|---|---|
| 4,571,477 A | * | 2/1986 | Weber | B23H 7/02 219/69.12 |
| 4,960,971 A | | 10/1990 | Kawanabe | |
| 5,685,060 A | | 11/1997 | Tibbet | |
| 7,007,382 B2 | * | 3/2006 | Mantel | B24B 19/02 29/889 |
| 9,170,182 B2 | | 10/2015 | Gibson et al. | |
| 2010/0025379 A1 | * | 2/2010 | Ben Salah | B23H 9/10 29/889.7 |
| 2010/0325852 A1 | * | 12/2010 | Frederick | F01D 5/3007 29/889 |
| 2014/0257542 A1 | | 9/2014 | Li et al. | |
| 2015/0047168 A1 | * | 2/2015 | James | B23P 6/00 29/402.11 |
| 2015/0127136 A1 | | 5/2015 | Abe | |
| 2015/0267540 A1 | | 9/2015 | Grilli et al. | |
| 2016/0059369 A1 | * | 3/2016 | Minotti | B23Q 7/043 219/69.12 |

(Continued)

FOREIGN PATENT DOCUMENTS

| | | | | |
|---|---|---|---|---|
| JP | 60034219 A | * | 2/1985 | |
| JP | 03121722 A | * | 5/1991 | ............... B23H 7/04 |

(Continued)

OTHER PUBLICATIONS

Machine translation of Japan Patent No. 60-034,219-A,Mar. 2022 (Year: 2022).*

(Continued)

*Primary Examiner* — Geoffrey S Evans
(74) *Attorney, Agent, or Firm* — Norton Rose Fulbright Canada LLP

(57) ABSTRACT

A method of wire electric discharge machining (wEDM) a feature in a part includes using wEDM, cutting and detaching a slug from a portion of the part that is to be detached from the part to define the feature, and thereby defining a validation cut-out in the portion, and using wEDM, cutting and detaching the portion having the validation cut-out from the part and thereby defining the feature.

18 Claims, 10 Drawing Sheets

(56) References Cited

U.S. PATENT DOCUMENTS

| | | |
|---|---|---|
| 2016/0067836 A1 | 3/2016 | Huxol et al. |
| 2017/0151618 A1 | 6/2017 | Shirai |
| 2017/0341172 A1 | 11/2017 | Oonishi et al. |
| 2018/0257189 A1 | 9/2018 | Johnson et al. |
| 2021/0094110 A1 | 4/2021 | Ing et al. |

FOREIGN PATENT DOCUMENTS

| | | | |
|---|---|---|---|
| JP | 11114725 | | 4/1999 |
| JP | 2010120117 A | * | 6/2010 |

OTHER PUBLICATIONS

Machine translation of Japan Patent No. 3-121,722-A, Mar. 2022 (Year: 2022).*
Machine translation of Japan Patent No. 2010-120,117-A, Mar. 2022 (Year: 2022).*

* cited by examiner

50A

52A — Manufacture a body including an engagement feature shaped to removably engage a securement assembly of a wEDM machine to secure the body to the securement assembly of the wEDM machine instead of a part to be machined by the wEDM machine.

54A — Manufacture a fastener assembly connected to the body, the fastener assembly operable to removably secure a validation coupon to the body, the validation coupon being larger than the cut-out but smaller than the part to be machined.

56A — Dimension the body and the fastener assembly of the tool to:

a) position the validation coupon in the given location when the fastener assembly removably receives and secures therein the validation coupon and the body of the tool is removably engaged to the securement assembly of the wEDM machine instead of the part to be machined, and b) orient the validation coupon relative to the wEDM machine by removably engaging the tool to the securement assembly of the wEDM machine to permit a wEDM machining assembly of the wEDM machine to machine the cut-out in the validation coupon.

Fig-5A

```
                                  60
                                    ╲
                                                            ┌─ 62
┌───────────────────────────────────────────────────────────┐
│  Machine, using wEDM, a slug out of a portion of a part   │
│  to define a validation cut-out in that portion of the    │
│  part.                                                    │
└───────────────────────────────────────────────────────────┘
                              │
                              ▼                         ┌─ 64
┌───────────────────────────────────────────────────────────┐
│  Machine, using wEDM, the portion out of the part to      │
│  define a feature of the part.                            │
└───────────────────────────────────────────────────────────┘
                              │
                              ▼                         ┌─ 55B
┌ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  Analyze the detached portion and/or the validation      │
│  cut-out therein, determine and compare characteristics  │
│  to a set of threshold characteristics.                  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
                              ▼                         ┌─ 59B
┌ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  In response to a positive determination from the        │
│  analysis, perform subsequent processing of the part /   │
│  turbine disc.                                           │
└ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Fig-6

```
                                            ┌─ 70
                                            ▼
┌──────────────────────────────────────────── 72
│ Execute, using a wEDM machine having a turbine disc removably
│ engaged thereto for wEDM, a wEDM roughing pass to define a
│ fir-tree shaped validation cut-out in the turbine disc in a given
│ location of a given slot to be machined in the turbine disc using the
│ wEDM machine, the validation cut-out having a validation surface.
└──────────────────────────────────────────────
                         │
                         ▼                   ┌─ 74
┌──────────────────────────────────────────────
│ Execute, using the wEDM machine, at least one additional wEDM pass
│ along the validation surface to give the validation surface a surface
│ finish to which the given slot in the turbine disc is to be machined.
└──────────────────────────────────────────────
                         │
                         ▼                   ┌─ 76
┌──────────────────────────────────────────────
│ Machine, using the wEDM, slots in the turbine disc in respective ones
│ of given locations of the slots, the slots including the given slot, by
│ executing respective iterations of the roughing pass with respect to
│ the slots, the step of wEDM the slots removing from the turbine disc a
│ portion of the turbine disc having the validation cut-out.
└──────────────────────────────────────────────
                         │
                         ▼                   ┌─ 78
┌──────────────────────────────────────────────
│ Execute, using the wEDM, respective iterations of the at least one
│ additional pass along surfaces of the turbine disc defining the slots to
│ give the surfaces of the turbine disc the surface finish.
└──────────────────────────────────────────────
```

Fig-7

METHODS AND SYSTEMS FOR WIRE ELECTRIC DISCHARGE MACHINING AND VALIDATION OF PARTS

TECHNICAL FIELD

The application relates generally to methods and systems for wire electric discharge machining and validation of parts.

BACKGROUND

Prior art methods of wire electric discharge machining (wEDM) cut-outs in parts are known and suitable for their intended purposes. In some applications, such as aerospace applications, in which wEDM may be used usually involve machining relatively expensive parts and labour. Hence, improvements to existing wEDM methods are desirable, especially in the aerospace industry, as even seemingly small improvements may provide for material advantages such as materials, cost and time savings for example.

SUMMARY

In one aspect, there is provided a method of wire electric discharge machining (wEDM) a feature in a part, comprising: using wEDM, cutting and detaching a slug from a portion of the part that is to be detached from the part to define the feature, and thereby defining a validation cut-out in the portion; and using wEDM, cutting and detaching the portion having the validation cut-out from the part and thereby defining the feature.

In some embodiments, the feature is a fir-tree shaped slot, and the validation cut-out is fir-tree shaped.

In some embodiments, the validation cut-out has a surface, and the cutting and detaching the slug includes executing a plurality of wEDM passes along the surface to give the surface a surface finish.

In some embodiments, the method comprises using wEDM, cutting a plurality of features in the part by executing respective additional iterations of the plurality of wEDM passes with respect to each of the features to give a surface of each of the features the surface finish of the surface of the validation cut-out, the feature being one of the features.

In some embodiments, the step of cutting and detaching the slug is executed using a wEDM machine and the step of cutting the features is executed using the wEDM machine.

In some embodiments, the plurality of wEDM passes executed to define the surface of the validation cut-out executed by the wEDM machine using a set of wEDM cutting parameters, and the respective additional iterations of the plurality of wEDM passes are executed using the set of wEDM cutting parameters.

In some embodiments, the method comprises determining a set of characteristics of a surface of the validation cut-out; and where the determined set of characteristics meets a set of threshold characteristics associated with the part, designating the feature in the part as acceptable, and else, designating the feature in the part as unacceptable.

In some embodiments, the step of determining the set of characteristics includes executing a cleaning process with respect to the portion of the part.

In some embodiments, the step of determining the set of characteristics includes analyzing the surface of the validation cut-out after the step of executing the cleaning process.

In some embodiments, the step of determining the set of characteristics includes executing a metallurgical analysis process with respect to the portion of the part.

In some embodiments, the metallurgical analysis process includes cutting the portion of the part into multiple parts.

In another aspect, there is provided a method of defining a plurality of slots in a turbine disc, the slots being fir-tree shaped and having respective given locations in the turbine disc, comprising, using a wEDM machine: executing a roughing pass to define a fir-tree shaped validation cut-out in the turbine disc in the given location of a given slot of the slots, the validation cut-out having a validation surface; executing at least one additional pass along the validation surface to give the validation surface a surface finish; wEDM the slots in the turbine disc in respective ones of the given locations by executing respective iterations of the roughing pass with respect to the slots, the step of wEDM the slots removing from the turbine disc a portion of the turbine disc having the validation cut-out; and executing respective iterations of the at least one additional pass along surfaces of the turbine disc defining the slots to give the surfaces of the turbine disc the surface finish.

In some embodiments, the method comprises, after a cleaning process followed by a chemical analysis have been completed with respect to the portion of the turbine disc having the validation cut-out, in response to determining that the set of results of the chemical analysis meets a threshold set of chemical results associated with the portion of the turbine disc, executing a metallurgical analysis process with respect to the portion of the turbine disc.

In some embodiments, the method comprises in response to determining that a set of results of the metallurgical analysis meets a threshold set of metallurgical results associated with the portion of the turbine disc, designating the turbine disc as acceptable for further processing.

In another aspect, there is provided a system for machining a plurality of slots in a turbine disc, the slots being fir-tree shaped and having respective given locations in the turbine disc, comprising: a wEDM machine configured to removably engage the turbine disc for wEDM features into the turbine disc; and a controller in communication with the wEDM machine, the controller comprising a processor and a non-transitory memory operatively connected to the processor, the non-transitory memory storing a technology file that includes therein wEDM parameters and processor-executable instructions in the non-transitory memory, the processor-executable instructions, when executed by the processor while the turbine disc is engaged to the wEDM machine, causing the processor to control the wEDM machine using the wEDM parameters to: execute a roughing pass to remove a portion of the turbine disc from the given location of a given slot of the slots to define a fir-tree shaped validation surface disposed inward of a fir-tree shape of the given slot; execute at least one additional pass along the fir-tree shaped validation surface to give the fir-tree shaped validation surface a surface finish; and machine the slots in the turbine disc in respective ones of the given locations of the slots by executing respective additional iterations of the roughing pass followed by respective additional iterations of the at least one additional pass, the step of the executing a given roughing pass of the respective additional iterations of the roughing pass removing from the turbine disc a portion of the turbine disc having the fir-tree shaped validation surface, and the step of the executing the respective additional iterations of the at least one additional pass giving surfaces of the turbine disc defining the slots the surface finish.

In some embodiments, the non-transitory memory stores therein a technology file that includes wEDM parameters, and the processor-executable instructions, when executed by the processor while the turbine disc is engaged to the wEDM machine, cause the processor to process the technology file to control the wEDM machine to execute all of: a) the roughing pass to remove the portion of the turbine disc, b) the at least one additional pass along the fir-tree shaped validation surface, c) the respective additional iterations of the roughing pass, and d) the respective additional iterations of the at least one additional pass.

In some embodiments, the wEDM parameters include: roughing pass parameters, and post-roughing pass parameters; and the processor-executable instructions, when executed by the processor while the turbine disc is engaged to the wEDM machine, cause the processor to process the technology file to control the wEDM machine to execute: both steps a) and c) according to the roughing pass parameters, and both steps b) and d) according to the post-roughing pass parameters.

In some embodiments, the at least one additional pass includes a finishing pass and a polishing pass.

In some embodiments, the post-roughing pass parameters include finishing pass parameters and polishing pass parameters.

BRIEF DESCRIPTION OF THE DRAWINGS

Reference is now made to the accompanying figures in which:

FIG. 5A is a diagram showing a method of manufacturing the tool of FIG. 2;

FIG. 6 is a diagram showing a method of wEDM a cut-out in a part;

FIG. 7 is a diagram showing another method of wEDM a cut-out in a part;

DETAILED DESCRIPTION

Figure 1:
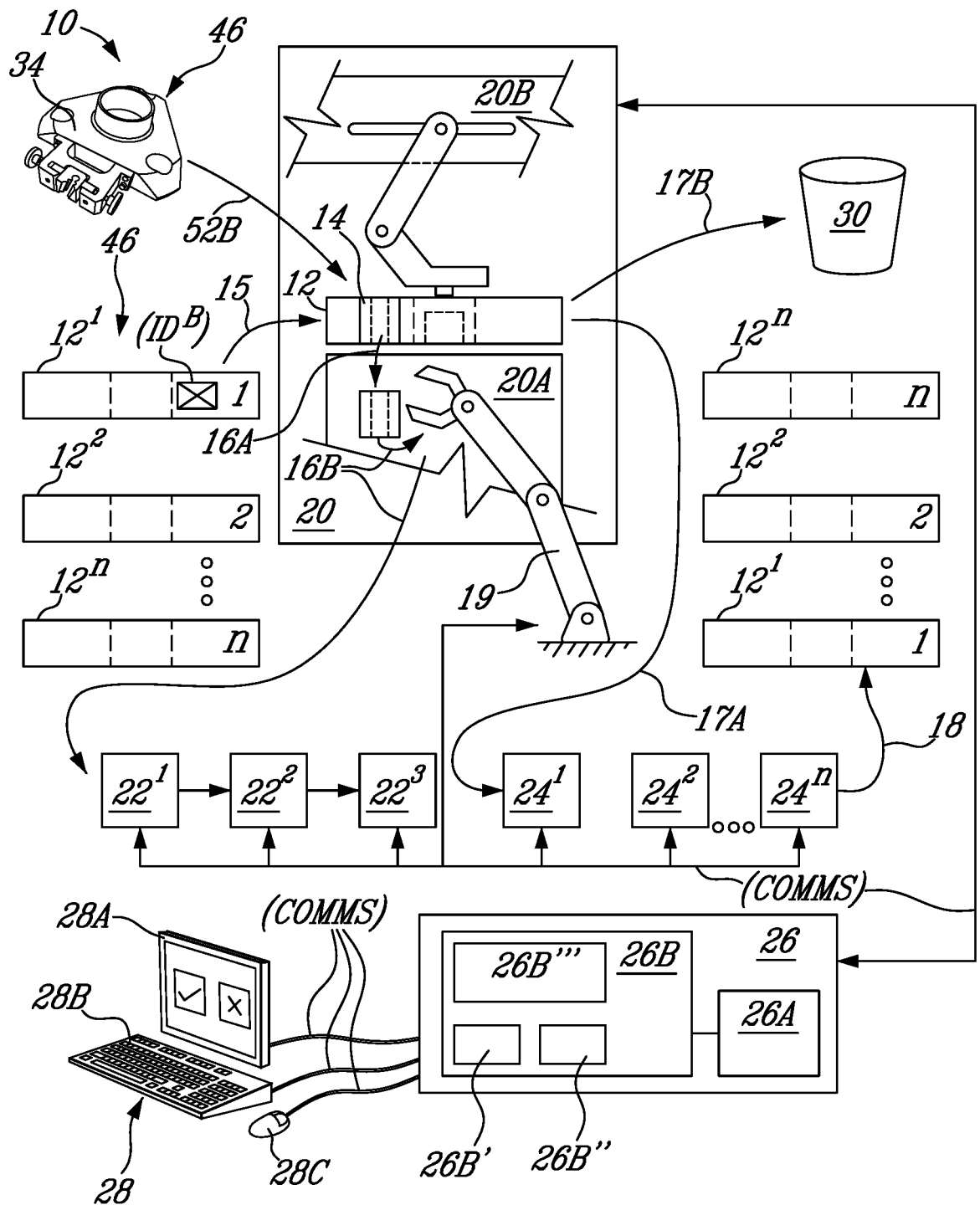
FIG. 1 is a schematic of a system for machining cut-outs in parts using wire electric discharge machining(wEDM) and for validating the parts.
Figure 2:
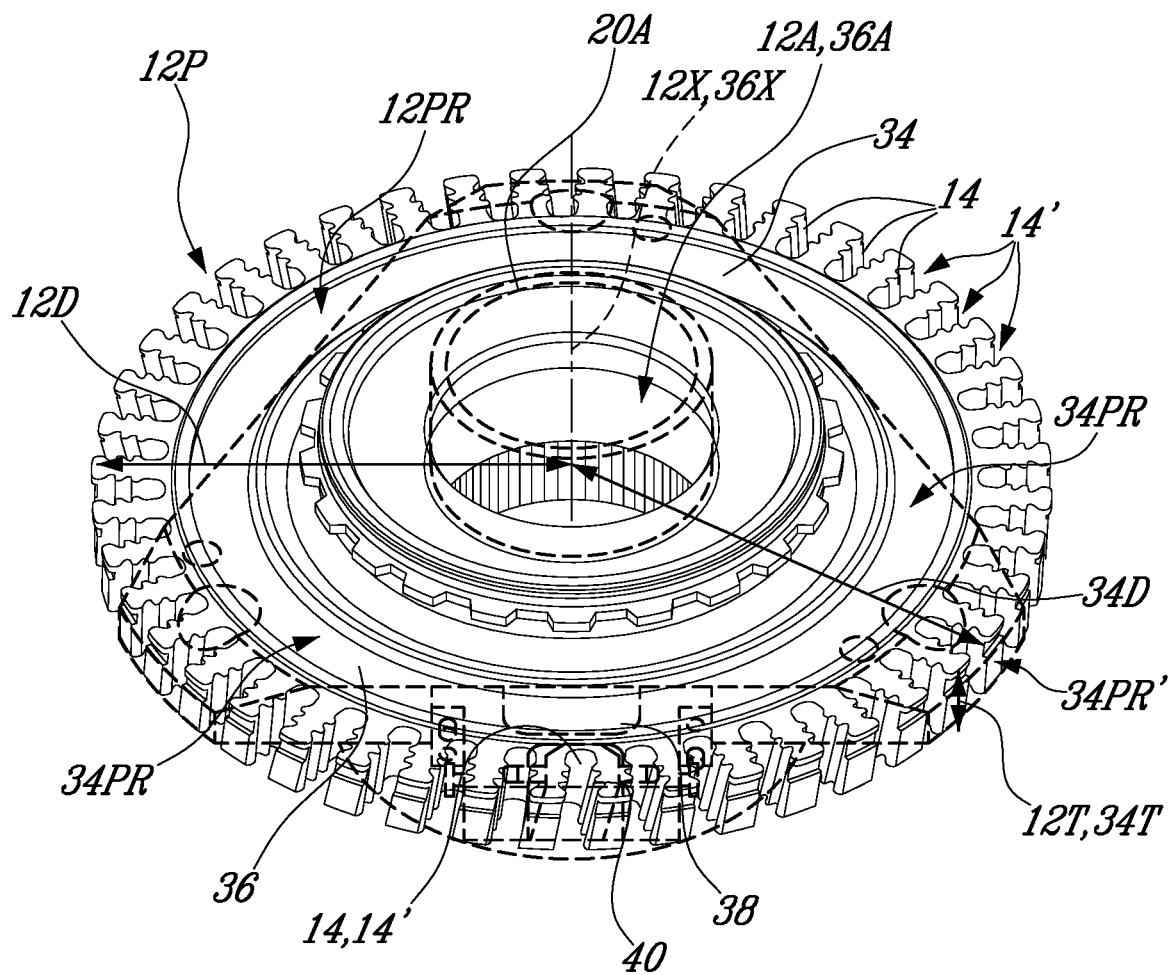
FIG. 2 is a partially transparent perspective view of a part made using the system of FIG. 1 and of a validation tool superposed over the part.

FIG. 1 illustrates a system 10 for machining, in a turbine disc 12, a plurality slots 14. As shown in FIG. 2, in this embodiment the slots 14 are fir-tree shaped and have respective given locations 14' in the turbine disc 12. To maintain clarity, only some of the slots 14 and only some of the respective given locations 14' in the turbine disc 12 have been labeled with their respective reference numerals. As shown in FIG. 2, the turbine disc 12 has a rotation axis 12X defined by an aperture 12A extending through a center of the turbine disc 12, a periphery 12P in which the slots 14 are defined in this non-limiting embodiment, and an outer profile 12PR. The outer profile 12PR includes a diameter 12D and a thickness 12T. As shown, in this embodiment the slots 14 extend through an entirety of the thickness 12T. In some embodiments, the turbine disc 12 may be a conventional turbine disc as used in aerospace applications.

The turbine disc 12 is one example of a part to be machined by the system 10. It is contemplated that in other embodiments, a different part may be machined. Similarly, the slots 14 are one example of a cut-out to be machined in the turbine disc 12. In other embodiments, a different one or more cut-outs may be machined in the turbine disc 12 and/or in other one or more parts. Stated otherwise, the machining and validation systems and methods of the present technology may be applied for manufacturing parts and cut-outs different from the turbine disc 12 and the slots 14. Hence, in embodiments in which a different part is machined, the different part may have a different outer profile 12PR and thickness 12T.

As shown schematically in FIG. 1 with arrows 15, 16A, 16B, 17A, 17B, and 18, in this embodiment the system 10 may be used to manufacture and/or discard/recycle a series ($12^1$, $12^2$ . . . $12^n$) of the turbine disc 12. To this end, in the present embodiment, the system 10 includes a robotic system 19, a wire electric discharge machining(wEDM) machine 20, validation stations $22^1$, $22^2$, $22^3$, part processing stations $24^1$, $24^2$ . . . $24^n$, a controller 26, and an input-output system 28. Also as shown, in some embodiments, a discarding/recycling station 30 may also be provided. Each of these components is described next, in order.

As shown in FIG. 1, in this embodiment, the robotic system 19 may be a conventional robotic system selected and configured using conventional engineering techniques to carry out the functionality described herein. The robotic system 19 is therefore not shown herein in detail and is not described herein in detail. The robotic system 19 may be different than shown, so long as it is capable of providing the functionality and executing the steps described herein. As an example, in some embodiments, the robotic system 19 may include one or more conveyors selected to provide the functionality described herein, and/or may include one or more human operators which may execute at least some of the functionality described herein. In some embodiments, the robotic system 19 may be omitted for example, in which case one or more human operators may be used to carry out the functionality described herein.

Still referring to FIG. 1, the wEDM machine 20 may include a securement assembly 20A configured to removably engage a part to be machined, which in this embodiment is the turbine disc 12 to be machined, to the wEDM machine 20. The wEDM machine 20 may also include a wEDM machining assembly 20B configured to machine the part using a wEDM process, which includes machining a cut-out in a given location in the part. As explained above, in this embodiment, the cut-out may be any given one of the slots 14 in the turbine disc 12, in the given location 14' of that slot 14. For purposes of consistency, in this document, the given location 14' of each given slot 14 is referred to as being relative to the wEDM machine 20 when the turbine disc 12 is removably engaged to the securement assembly 20A of the wEDM machine 20 for being machined by the wEDM machine 20.

In this embodiment, the wEDM machine 20 may be a conventional wEDM machine. Hence, in this embodiment, the securement assembly 20A may be a conventional securement assembly selected and configured for removably engaging turbine discs 12 thereto. Similarly, in this embodiment, the wEDM machining assembly 20B may be a conventional machining assembly selected and configured to machine, using conventional wEDM, the slots 14 that may be required for each given turbine disc 12 that may be removably engaged to the securement assembly 20A, and hence to the wEDM machine 20. The wEDM machine 20 and its possible components are therefore not shown herein in detail and are not described herein in detail. The wEDM machine 20 may be different than shown, so long as it is capable of providing the functionality and executing the steps described herein.

Still referring to FIG. 1, the validation stations $22^1$, $22^2$, $22^3$ in this embodiment include a cleaning station $22^1$. In some embodiments, the cleaning station $22^1$ may be partly or fully automated, such as for example using conventional automation technology selected and configured to provide for the functionality of the cleaning station $22^1$ as described herein. In some embodiments, the cleaning station $22^1$ may be at least in part be operated by human operators to provide for at least some of the functionality of the cleaning station $22^1$ as described herein. In the present embodiment, the cleaning station $22^1$ is fully automated and is positioned relative to the robotic system 19 and the wEDM machine 20 such that the robotic system 19 may be operable to move one or more parts from or from a proximity of the wEDM machine 20 to the cleaning station $22^1$. The cleaning station $22^1$ in this embodiment is configured, using conventional technology for example, to receive a given one or more parts, which may be the turbine disc 12 and/or a part cut from the turbine disc 12, and to execute a cleaning process with respect to the one or more parts. The cleaning process may be conventional and may be selected to suit each particular embodiment of wEDM that may be executed by the wEDM machine 20 and/or each particular material (e.g. alloy) from which the one or more parts may be made. The cleaning process is therefore not described herein in detail.

Still referring to FIG. 1, the validation stations $22^1$, $22^2$, $22^3$ in this embodiment further include a chemical analysis station $22^2$. In some embodiments, the chemical analysis station $22^2$ may be partly or fully automated, such as for example using conventional automation technology selected and configured to provide for the functionality of the chemical analysis station $22^2$ as described herein. In some embodiments, the chemical analysis station $22^2$ may be at least in part be operated by human operators to provide for at least some of the functionality of the chemical analysis station $22^2$ as described herein. In the present embodiment, the chemical analysis station $22^2$ is operatively connected, such as via one or more conventional conveyors and/or the robotic system 19 for example, to the cleaning station $22^1$ so as to automatically receive one or more parts that may be leaving the cleaning station $22^1$ after the one or more parts have been cleaned by the cleaning station $22^1$. The chemical analysis station $22^2$ in this embodiment is fully automated, such as for example using conventional automation technology selected and configured to provide for the functionality of the chemical analysis station $22^2$ as described herein.

Still referring to FIG. 1, the validation stations $22^1$, $22^2$, $22^3$ in this embodiment further include a metallurgical analysis station $22^3$. In some embodiments, the metallurgical analysis station $22^3$ may be partly or fully automated, such as for example using conventional automation technology selected and configured to provide for the functionality of the metallurgical analysis station $22^3$ as described herein. In the present embodiment, the metallurgical analysis station $22^3$ is in part operated by human operators using conventional tools to provide for at least some of the functionality of the metallurgical analysis station $22^3$ as described herein. In other embodiments, the validation stations $22^1$, $22^2$, $22^3$ may have a different configuration and/or a different number of validation stations may be used to provide for the functionality described herein.

Still referring to FIG. 1, the part processing stations $24^1$, $24^2$ ... $24^n$ may include any number and/or configuration of part processing stations which may be conventional and may be selected for example using conventional engineering techniques to suit each particular series of parts to be produced using the system 10. As a non-limiting example, in the present embodiment, the part processing stations $24^1$, $24^2$ ... $24^n$ may include a conventional turbine disc balancing station $24^1$ which may be selected and configured to balance the turbine discs 12 machined by the wEDM machine 20, a surface treatment station $24^2$ which may be selected and configured to provide the turbine discs 12 with "final" surface finish(es) that may be required for each given application of the turbine discs 12, and the like.

Still referring to FIG. 1, the controller 26 in this embodiment may be any suitable controller, and may be for example a conventional computer selected and configured using conventional parts and programming techniques to provide for the functionality described herein. As a non-limiting example, to this end in the present embodiment, the controller 26 includes a processor 26A, which may include for example one or more conventional central processing units (CPU(s)), and a non-transitory memory 26B, which may include for example a hard drive. The non-transitory memory 26B stores thereon processor-executable instructions and is operatively connected to the processor 26A, such as via a suitable memory bus for example, to allow the processor 26A to execute the processor-executable instructions to carry out the functionality described herein. The controller 26 may be in communication with one or more of the robotic system 19, the wEDM machine 20, and the station(s) $22^{1\ \cdots\ n}$, $24^{1\ \cdots\ n}$, to control/operate these components of the system 10 to provide for the functionality described herein. As an example, the particular combination of operating connections of the controller 26 to one or more of the components of the system 10 may be selected depending on the particular embodiment and extent of automation of the system 10 for example, and may be implemented using any suitable conventional parts and communication protocols. As a non-limiting example, in some embodiments, the communications of the controller 26 to the other components of the system 10 may be wireless, wired, or a combination of wireless and wired. The communications of the controller 26 to the other components of the system 10 in the present embodiment are shown with respective arrows labeled (COMMS).

Still referring to FIG. 1, the input-output system 28 in this embodiment may be any suitable input-output system, which may be for example selected and configured using conventional parts and programming techniques to provide for the functionality described herein. As a non-limiting example, to this end in the present embodiment, the input-output system 28 includes a conventional monitor 28A for displaying information thereon, such as data received from the controller 26 for example, and a conventional keyboard 28B and mouse 28C for entering data into and interacting with the controller 26. It is contemplated that any other input-output system 28 may be used and/or that the input-output system 28 may be part of the controller 26 and/or that the input-output system 28 may be omitted in some embodiments, so long as the functionality of the system 10 as described herein is provided. Stated more broadly, the system 10 may have more or fewer of the components as described herein, and/or different embodiments of the components described herein, to suit each particular embodiment of the methods of the present technology that are described herein.

Figure 3:
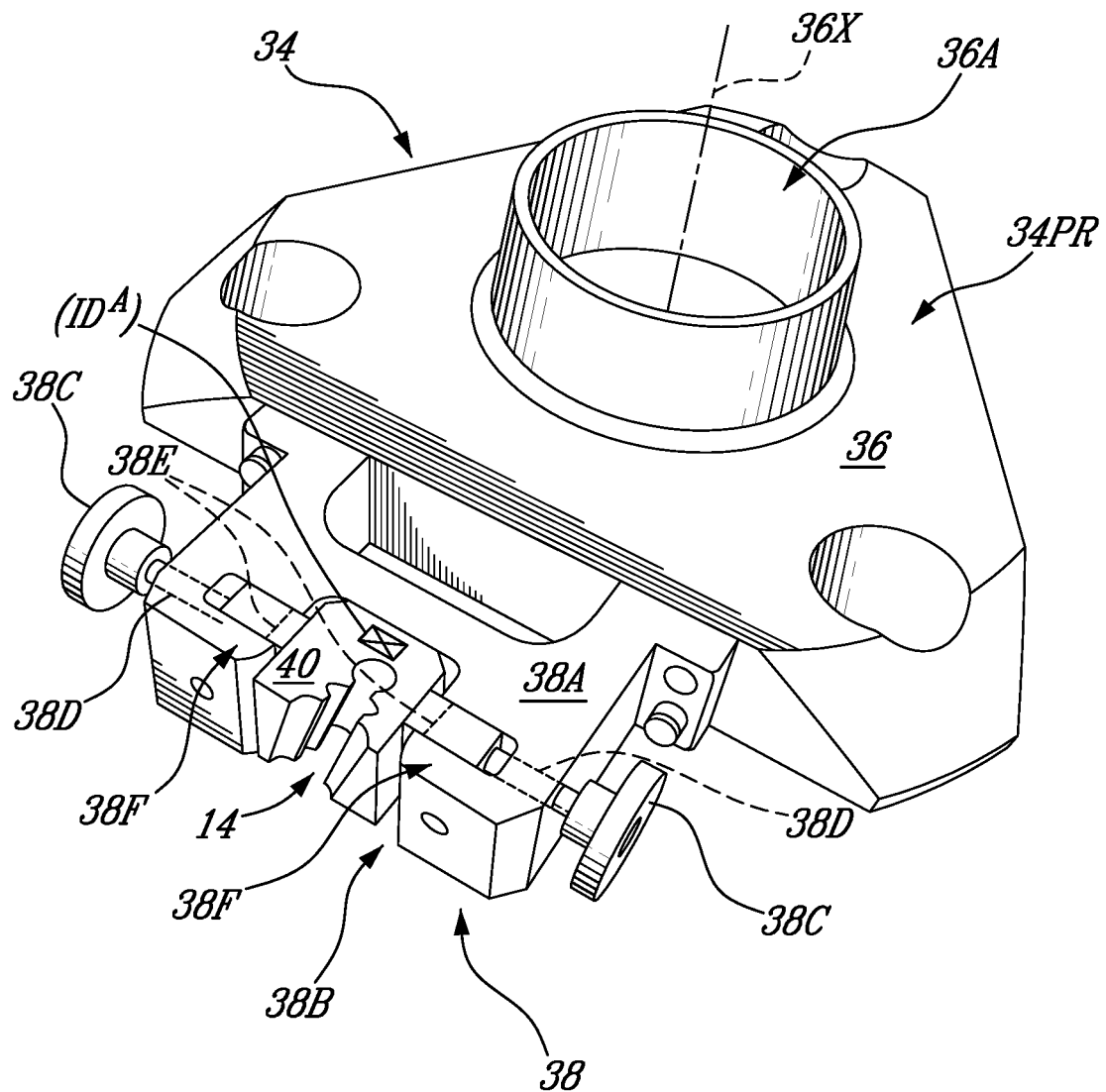
FIG. 3 is a perspective view of the tool of FIG. 2, the tool having a validation coupon removably secured thereto, the validation coupon having a fir-tree shaped slot machined therein.

Referring now to FIGS. 2 and 3, in some embodiments and as described below with respect to methods of the present technology which may for example be implemented using the system 10, the system 10 may be used with a tool 34 for validating one or more parts to be machined by the wEDM machine 20. The tool 34 may include a body 36 including an engagement feature 36A. As shown in FIG. 2 by the tool 34 being superposed over the turbine disc 12, the engagement feature 36A of the tool 34 may be shaped to removably engage the securement assembly 20A of the wEDM machine 20 instead of the part (the turbine disc 12 in this embodiment) to be machined. This allows the tool 34 to be removably engaged to the wEDM machine 20 instead of the part to be machined.

In the present embodiment where the part is the turbine disc 12, and as shown in FIG. 2, the engagement feature 36A of the tool 34 is an aperture 36A extending through the body 36 of the tool 34. Also as shown and although this need not be the case in other embodiments, the aperture 36A in the body 36 of the tool 34 is made to be the same size as the aperture 12A in the turbine disc 12. In this embodiment, the aperture 36A in the body 36 of the tool 34 defines a rotation axis 36X of the tool 34. The rotation axis 36X of the tool 34 may be in the position of the rotation axis 12X of the turbine disc 12 relative to the securement assembly 20A of the wEDM machine 20 when these respective parts are in respective turns mounted to the securement assembly 20A of the wEDM machine 20 as shown in FIG. 2 and as described herein.

Accordingly, as shown in FIG. 2, the turbine disc 12 may be removably engaged to the 20A securement assembly 20A of the wEDM machine 20 via the aperture 12A, and the tool 34 may be removably engaged to the 20A securement assembly 20A of the wEDM machine 20 via the aperture 36A instead of the turbine disc 12. For the purposes of this document, the term "instead of" means that when the part/turbine disc 12 is removed from the securement assembly 20A of the wEDM machine 20, the tool 34 may be mounted to the securement assembly 20A of the wEDM machine 20 in the location that was (or is to be) occupied by the part/turbine disc 12. In other embodiments where the system 10 is used to manufacture a part other than a turbine disc 12, the engagement feature 36A of the tool 34 may be different. In some such embodiments, the engagement feature 36A of the tool 34 may be made using any suitable conventional engineering and manufacturing techniques for example to match the engagement feature(s) of the other part(s) that are may be used to removably engage the other part(s) to the wEDM machine 20.

Figure 4:
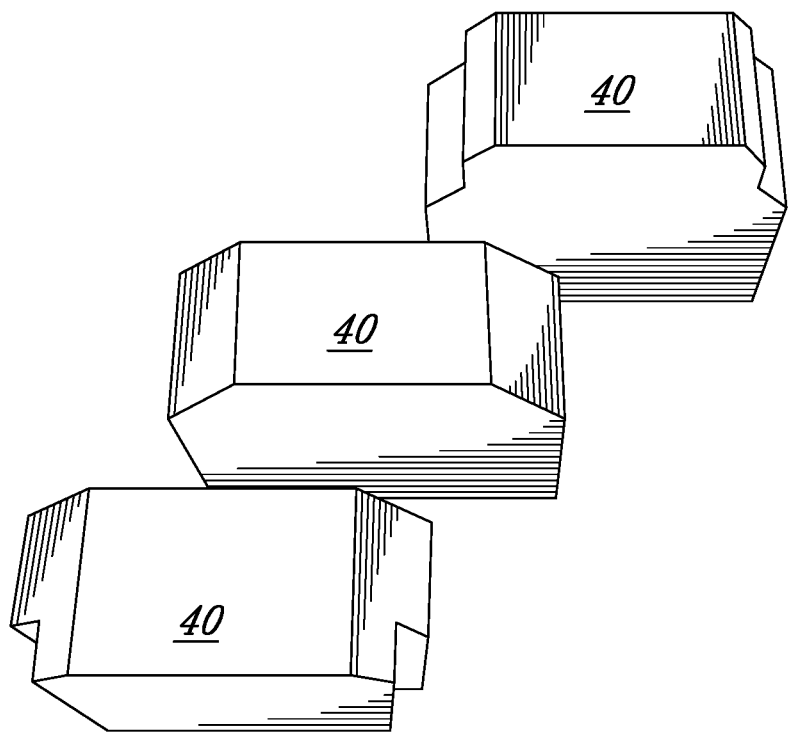
FIG. 4 is a perspective view of new validation coupons that may be used with the tool of FIG. 2.

As best shown in FIG. 3, the tool 34 may further include a fastener assembly 38 connected to the body 36. The fastener assembly 38 may be operable to removably secure a validation coupon 40 to the body 36. In this embodiment the validation coupon 40 is made of the same material as the turbine disc 12, or at least the same material as the part of the turbine disc 12 that has the feature (in this embodiment the fir-tree slot 14) that is to be validated using the validation coupon 40, so as to help mimic the feature, the structure in which the feature is made, and its surface finish. The validation coupon 40 shown in FIG. 3 has had a slot 14 of the turbine disc 12 machined into it, as described later in this document. On the other hand, examples of unused validation coupons 40 that may be used in methods utilizing the tool 34 as described herein, are shown in FIG. 4.

In some embodiments, a given validation coupon 40 that is used with the tool 34 may be larger than a respective cut-out to be machined into a given part that is to be validated by using the tool 34, such as for example a given slot 14 in the case of the turbine disc 12, but smaller than the part to be machined. To this end, in the present embodiment the fastener assembly 38 includes a block 38A defining in the block 38A a cavity 38B shaped to receive the validation coupon 40, and a fastener 38C connected to the block 38A. More particularly, in the present embodiment, there are two fasteners 38C connected to the block 38A at opposite sides of the cavity 38B. Each of the fasteners 38C is threaded through respective threaded apertures 38D in the block 38A and is movable between an open position 38E, shown schematically in FIG. 3, and a closed position 38F. The fasteners 38C are movable into the cavity 38B toward each other when moved from their respective open positions 38E toward their respective closed positions 38E.

In the open position 38E, the fasteners 38C allow the validation coupon 40 to move in and out of the cavity 38B. To this end, and although may not be the case in other embodiments, the cavity 38B faces away from and is open in a direction extending away from the rotation axis 36X of the body 36. In the closed position 38F, the fasteners 38C secure the validation coupon 40 in the cavity 38B. As shown with the turbine disc 12 and the tool 34 being virtually superposed one over the other in FIG. 2, the body 36 and the fastener assembly 38 of the tool 34 are dimensioned relative to the turbine disc 12 such that when the fastener assembly 38 removably receives and secures therein the validation coupon 40, and the body 36 of the tool 34 is secured via the engagement feature 36A to the securement assembly 20A of the wEDM machine 20 instead of the turbine disc 12, the validation coupon 40 is in the given location 14' of one of the slots 14 in the turbine disc 12, and is oriented relative to the wEDM machine 20 to permit the wEDM machine 20 to machine the slot 14 in the validation coupon 40. In an aspect, positioning the validation coupon 40 in the same location as the feature that has or is to be made in the turbine disc 12 using wEDM helps the validation coupon 40 and the validation feature made therein mimic the feature in the turbine disc 12.

In another aspect, this same positioning may allow a coordinate-measuring machine (CMM) to be used to inspect the tool-and-coupon assembly 34, 40 while it's engaged to the wEDM machine 20 to determine whether the validation feature is within a given tolerance band associated with the corresponding feature in the turbine disc/part 12 and/or to provide machine offsets for the turbine disc/part 12 to be machined. In yet a further aspect, since at least in the present embodiment the tool-and-coupon assembly 34, 40 mimics the part to be validated (i.e. the turbine disc 12 in this embodiment) by having at least a substantially same validation feature shape, location, locating diameter and face, the tool-and-coupon assembly 34, 40 may be used as a setup part, thus avoiding sacrifice of real parts (i.e. the turbine discs 12 in this embodiment) for wEDM machine 20 setup purposes.

Referring to FIG. 2, further in the present embodiment, and although need not be the case in other embodiments, the body 36 and the fastener assembly 38 of the tool 34 together define an outer profile 34PR of the tool 34 that at least in part matches the outer profile 12PR of the turbine disc 12 (or other part, if the tool 34 is designed for validating a different type of part as described above). In some embodiments and as shown in FIG. 2 for example, the outer profile 34PR of the tool 34 is selected to match at least a majority of the outer profile 12PR of the turbine disc 12. Such a feature may be referred to as a "mimicking" feature. As shown in FIG. 2, in this embodiment the tool 34 is dimensioned such that a thickness 34T of the tool 34T, and more particularly in this embodiment the thickness 34T of the body 36 of the tool 34, matches the thickness 12T of the turbine disc 12. More particularly, in this embodiment the thickness 34T of the body 36 of the tool 34 approximates, and in some embodiments equals, the thickness 12T of the turbine disc 12. Each of such features may also be referred to as a "mimicking" feature.

As shown in FIG. 2, in this embodiment the tool 34 is further dimensioned, for example using any suitable manufacturing method, such that the outer profile 34PR of the tool 34 includes peripheral portions forming at least a partial circular peripheral profile 34PR' that has a diameter 34D that equals the diameter 12D of the outer profile 12PR of the turbine disc 12. In other embodiments, the tool 34 may be dimensioned to form a circular peripheral profile 34PR' with a diameter 34D matching the diameter 12D of the outer profile 12PR of the turbine disc 12. In an aspect, one or more of the "mimicking" features of the tool 34, where present, may help improve an accuracy and/or reliability of methods executed using the tool 34 as described herein. While providing advantages in at least some applications and embodiments, in other applications and/or embodiments, one or more of the "mimicking" features of the tool 34 may be omitted.

As best shown in FIG. 3, in the present embodiment, the fastener assembly 38 is connected to the body 36 of the tool 34 by being riveted or otherwise suitably attached to the body 36. In other embodiments, the fastener assembly 38 may be connected to the body 36 of the tool 34 in any other suitable way, such as by being made integral with the body 36 for example. In other embodiments, a different number and/or configuration of fasteners 38C, and or a different fastener assembly 38 may be used to provide for the functionality of the tool 34 as described herein. In some embodiments, the tool 34 may include more than one fastener assembly 38 to simultaneously secure more than one validation coupon 40 thereto, so that for example at least some of the embodiments of validation methods described herein below may be executed simultaneously with respect to more than one cut-out/slot 14 of a given part 12 and with respect to the more than one corresponding validation coupon 40.

Now referring to FIG. 5A, the present technology provides a method 50A of manufacturing a tool, such as the tool 34, for validating a part to be machined, such as the turbine disc 12, by a wEDM machine, such as the wEDM machine 20. The method 50A includes a step 52A of manufacturing a body 36 including an engagement feature 36A shaped to removably engage the securement assembly 20A of the wEDM machine 20 to secure the body 36 to the securement assembly 20A of the wEDM 20 machine instead of the disc/part 12. The method 50A may also include a step 54A of manufacturing a fastener assembly/engagement feature 38 connected to the body 36, the fastener assembly/engagement feature 38 operable to removably secure a validation coupon 40 to the body 36, the validation coupon 40 being larger than the cut-out 14 but smaller than the part 12 to be machined.

The method 50A may further include, as part of one or both steps 52A, 54A or subsequent thereto for example, a step 56A of dimensioning the body 36 and the fastener assembly/engagement feature 38 of the tool 34 to: a) position the validation coupon 40 in the given location 14' of the cut-out 14 (e.g. of one of the cut-outs 14 for example) when the fastener assembly/engagement feature 38 removably receives and secures therein the validation coupon 40 and the body 36 of the tool 34 is removably engaged to the securement assembly 20A of the wEDM machine 20 instead of the part 12 to be machined, and b) orient the validation coupon 40 relative to the wEDM machine 20 by removably engaging the tool 34 to the securement assembly 20A of the wEDM machine 20 to permit the wEDM machining assembly 20B of the wEDM machine 20 to machine the cut-out 14 in the validation coupon 40.

In some embodiments, the step 56A of dimensioning may be executed one of: a) prior to one or both of the manufacturing the body 36 and the fastener assembly/engagement feature 38, such as in a suitable computer aided design (CAD) software or using a physical mock-up/model for example, and b) after one or both of the manufacturing the body 36 and the fastener assembly/engagement feature 38. In some such embodiments, the method 50A may further include, prior to the manufacturing the body 36 and the fastener assembly/engagement feature 38, modeling the body 36 and the fastener assembly/engagement feature 38 (e.g. via CAD or physical model(s)) to define an outer profile 34PR of the tool 34 that matches at least a part of an outer profile 12PR of the part 12 to be machined. In some embodiments, the part 12 to be machined is a turbine disc 12 and the step of modeling the body 36 and the fastener assembly/engagement feature 38 includes selecting a thickness 34T and a diameter 34D defined by the tool 34 to at least approximate a thickness 12T and a diameter 12D, respectively, of the turbine disc 12.

In summary, in some applications for example, the tool 34 may be manufactured, for example using the method 50A, specific to a particular one or more parts, such as the turbine disc 12, for validating multiple iterations of the one or more parts being made using one or more wEDM machines, such as the wEDM machine 20. To this end, and for example referring to FIGS. 1 and 2, a validation kit 46 comprising the tool 34 and the one or more parts ($12^1$, $12^2$ . . . $12^n$) to be validated using the tool 34 are described herein next.

A given validation kit 46 may for example include the tool 34 and multiple turbine discs 12, such as the series ($12^1$, $12^2$ . . . $12^n$) shown in FIG. 1, that are to be machined. The tool 34 and the part(s) 12 in each given validation kit 46 may include any given combination of the various features described herein above with regard to the tool 34 and the part(s) 12. As an example, and as shown schematically in FIG. 1 to the left of the wEDM machine 20, the series ($12^1$, $12^2$ . . . $12^n$) of turbine discs 12 to be machined may be in a form of shaped forgings that may have some of the turbine disc features but may not yet have the slots 14 and/or other features that are to be made by wEDM and in some cases by additional processes executed post-wEDM. The given validation kit 46 may be used as described next for example, to wEDM the slots 14 and/or other cut-outs in the turbine discs 12, and to validate the turbine discs 12 as being acceptable for use and/or further processing.

Figure 5B:
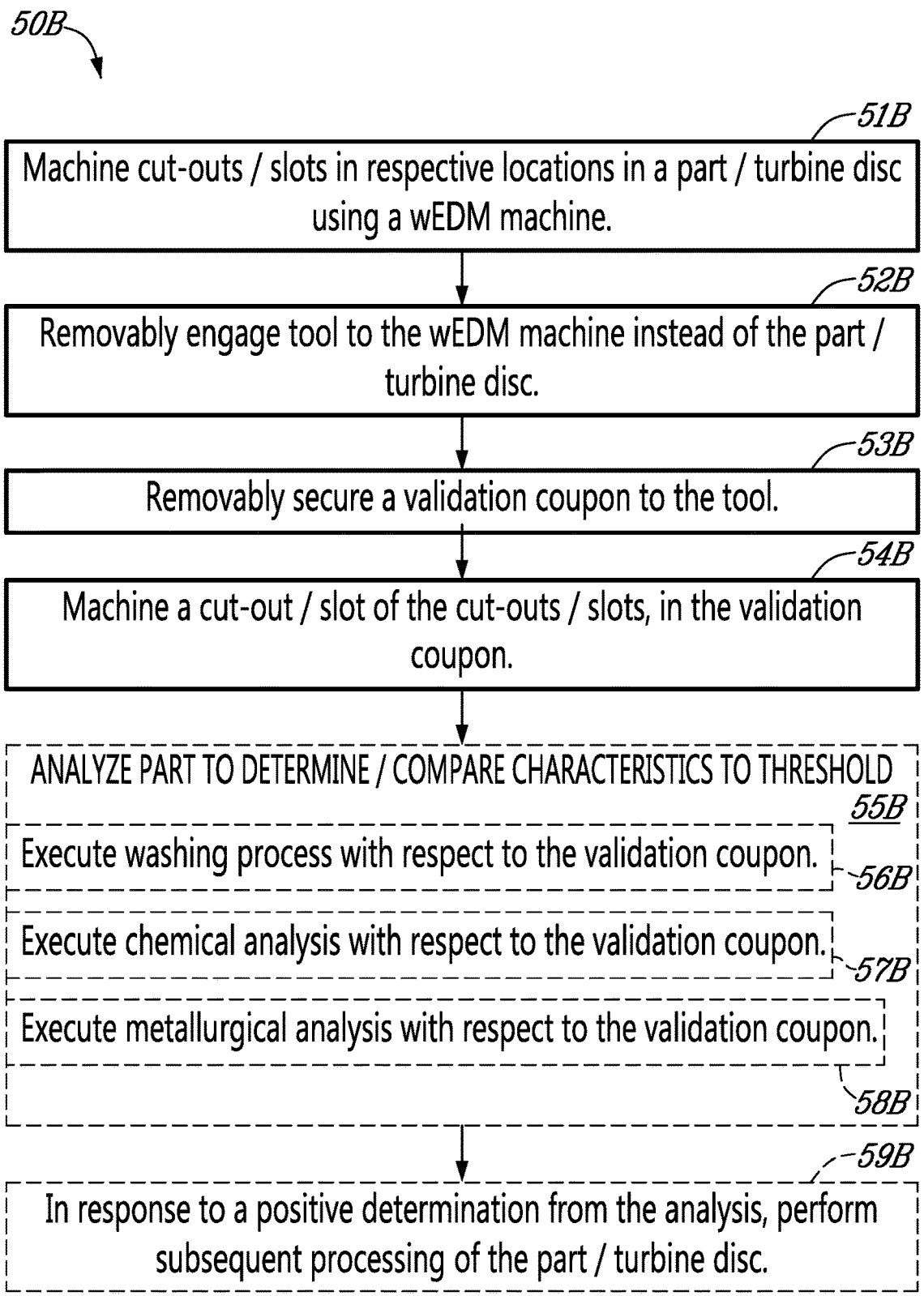
FIG. 5B is a diagram showing a method of making and validating a part using the system 10 and the tool of FIG. 2.

To this end, and referring to FIGS. 1 and 5B, the present technology provides a method 50B of wire electric discharge machining(wEDM) a cut-out, such as a slot 14, in a given location 14' in a part, such as a given turbine disc 12, the cut-out having a given shape, such as the fir-tree shape of the slot 14, once the part is machined. The method 50B may include a step 15, also shown schematically in FIG. 1 with arrow 15, of removably engaging the part/turbine disc 12 to the wEDM machine 20. The method 50B may proceed with a step 51B of controlling the wEDM machine 20, using for example the controller 26, to machine using a wEDM process one or more of the cut-outs/slots 14 in their respective locations 14' in the part/turbine disc 12 to one or more surface finishes. In the particular non-limiting embodiment, the slots 14 may be wEDM'ed by the wEDM machine 20 to all have one and the same surface finish. As an example, the surface finish may be achieved by the wEDM machining assembly 20B first executing a wEDM roughing pass along the respective shapes of the slots 14 to remove respective parts of the turbine disc 12 thereby creating the slots 14, as shown in FIG. 1 with arrow 16A with respect to one of the slots 14. The wEDM machining assembly 20B may then execute a wEDM finishing pass followed by a wEDM polishing pass along the surfaces created by the roughing pass and defining the slots 14.

The of method 50B may further include a step 52B of removably engaging the tool 34, and more particularly the engagement feature 36A thereof, to the wEDM machine 20, and more particularly to the securement assembly 20A, instead of the turbine disc 12. In some embodiments, step 52B may be performed prior to the steps 15 and 51B. As another example, in some embodiments, step 52B may be performed after to steps 15 and 51B. The method 50B may further include a step 53B of removably securing a validation coupon 40 to the tool 34. In some embodiments, the validation coupon 40 may be made from the same material(s) as the part/turbine disc 12 to be validated using the validation coupon 40. In some embodiments, the validation coupon 40 may be made from the batch of material(s) that was used to make the part/turbine disc 12 to be validated using the validation coupon 40.

In the non-limiting embodiment of the tool 34 shown in FIGS. 2 and 3, removable securement step 51B may include inserting the validation coupon 40 into the cavity 34B while the fastener(s) 38C are in their respective open positions 38E, and then moving the fastener(s) 38C toward their respective closed positions 38F until the validation coupon 40 is secured to the tool 34. In some embodiments, step 53B may be performed before step 52B. In some embodiments, step 53B may be performed after step 52B. In some embodiments, and depending on the particular embodiment of the tool 34 for example, the method 50B may include positioning the tool 34 with the validation coupon 40 secured thereto relative to the securement assembly 20A of the wEDM machine 20 until the validation coupon 40 is in the given location 14' (taken relative to the wEDM machine 20) of a given slot 14 that is to be, or which has been, machined in the turbine disc 12. In some embodiments, the positioning step may be performed manually or by a suitable robotic system 19 for example, as part of or after the step 52B of removably engaging the tool 34 to the wEDM machine 20. FIG. 2 shows the tool 34 being positioned relative to the securement assembly 20A of the wEDM machine 20 and relative to the turbine disc 12 such that the validation coupon 40 is in the given location 14' of a given slot 14.

The method 50B may further include a step 54B of controlling the wEDM machine 20, for example by the controller 26, to wEDM (a duplicate of) the given slot 14 that has, or is to be, wEDM'ed in the turbine disc 12, in the validation coupon 40. In the present embodiment, the wEDM machine 20 may be controlled using the controller 26 to execute the same series of passes as executed, or to be executed, in the step 51B of machining the slot(s) 14 in the turbine disc 12 to provide the same surface finish(es) to a resulting surface on the validation coupon 40 as the surface finish(es) that was/were targeted for the respective slot(s) 14 in the turbine disc 12. The slot 14 machined in the validation coupon 40 is shown in FIG. 3. In some embodiments, once step 54B has been performed, the validation coupon 40 may be for removed manually, or automatically via a suitable embodiment of the robotic system 19 for example, from the tool 34.

An analysis step 55B may then be performed on the validation coupon 40 to determine whether or not the validation coupon 40 and/or the surface defining the cut-out/slot 14 in the validation coupon 40 meet a set of characteristics that the part/turbine disc 12 may need to be considered acceptable for a given one or more applications. According to the present technology, it has been found that results of the analysis step 55B performed with respect to the validation coupon 40 at least as described herein may be representative of results that may be obtained using a same analysis process that may be performed with respect to the part/turbine disc 12.

The method 50B may further include a step of comparing/determining whether results from the analysis step 55B are indicative that the cut-out/slot 14 in the validation coupon 40 and/or the validation coupon 40 has/have a set of characteristics that meets the set of characteristics associated with the part/turbine disc 12. In some embodiments, the determination step may be part of the analysis step 55B and may be performed by the controller 26. Where the determination is positive, the part/turbine disc 12 may be designated as acceptable. As an example shown in FIG. 1, a positive designation may be generated by the controller 26 as a corresponding "positive" file or indicator 26B' stored in the non-transitory memory 26B, while a negative designation may be generated by the controller 26 as a corresponding "negative" file or indicator 26B" stored in the non-transitory memory 26B. Representative corresponding visual indicators may be in some embodiments displayed to an operator via the input-output system 28 associated with the controller 26.

In some embodiments, and depending on each particular embodiment of the part/turbine disc 12 to be machined and validated, the analysis step 55B may be performed using conventional analysis tools and methods suitable for the particular part. The analysis step 55B may also be implemented using the present technology, as described next. According to the present technology, the analysis step 55B may include a step 56B of executing a cleaning process with respect to the validation coupon 40, for example using the cleaning station $22^1$. In some embodiments in which the cut-outs/slots 14 are machined in the part/turbine disc 12 prior to machining a cut-out/slot 14 in the validation coupon 40, the cleaning process may be executed simultaneously with respect to both the validation coupon 40 and the part/turbine disc 12 after the cut-out/slot 14 has been machined in the validation coupon 40. In an aspect, this may help improve efficiency of the method 50B.

Once the cleaning step 56B has been completed, a chemical analysis step 57B may be performed with respect to the validation coupon 40 using for example the chemical analysis station $22^2$ to determine a set of chemical characteristics of the cut-out/slot 14 in the validation coupon 40 and/or the validation coupon 40. In a non-limiting example, the set of chemical characteristics includes concentrations of a plurality of elements. At step 59B, the controller 26 may receive the set of chemical characteristics, for example via automatic input and/or manual input via the input-output system 28, and determine whether the set of chemical characteristics meets a threshold set of chemical characteristics. Upon a positive determination, the controller 26 may designate the validation coupon 40 as acceptable for a subsequent metallurgical analysis step 58B, which may be performed using for example the metallurgical analysis station $22^3$.

The controller 26 may receive the set of metallurgical characteristics from the metallurgical analysis step 58B, for example via automatic input and/or manual input via the input-output system 28, and may determine whether the set of metallurgical characteristics meets a threshold set of metallurgical characteristics associated with the part/turbine disc 12. In some embodiments, the metallurgical analysis step 58B may include destructive testing involving cutting the validation coupon 40 into multiple cross-sections and/or chemical etching and/or scanning for cracks, with corresponding generation of results. Upon a positive determination from the metallurgical characteristics comparison, the controller 26 may designate the part/turbine disc 12 as acceptable for use and/or subsequent processing and/or use, depending on the particular part 12 and intended application thereof for example.

Such subsequent processing, where required, may be executed for example using the part processing stations $24^1$, $24^2$ . . . $24^n$ described above. The method 50B may accordingly proceed with a step 59B of subjecting the part/turbine disc 12 to the subsequent processing to arrive at a completed part/turbine disc 12. It is contemplated that depending on the particular part to be machined and validated, no subsequent processing steps may be needed. On the other hand, upon a negative determination, the controller 26 may designate the part/turbine disc 12 as unacceptable for use and/or subsequent processing. In such cases, the part/turbine disc 12 may be scrapped and/or recycled, as shown with arrow 17B in FIG. 1.

In some embodiments in which the validation coupon 40 is analyzed prior to cut-outs/slots 14 being machined into a corresponding part/turbine disc 12, upon a negative determination, the controller 26 may prevent machining of the cut-outs/slots 14 until the wEDM machine 20 is tuned to eliminate cause(s) of the negative determination. The method 50B may then be repeated with respect to one or more new validation coupons 40 for that same part/turbine disc 12, with possible subsequent tuning of the wEDM machine 20 in cases of subsequent negative determinations, until a positive determination is achieved. In response to the positive determination, the part/turbine disc 12 may be removably engaged to the wEDM machine 20 instead of the tool 34, and the controller 26 may control the wEDM machine 20 to machine the cut-outs/slots 14 in the part/turbine disc 12 with the corresponding positive determination assigned thereto.

In the present embodiment, the method 50B uses one validation coupon 40 to validate each turbine disc 12. In some embodiments, the method 50B may use multiple validation coupon 40 to validate each turbine disc 12. In some embodiments, the method 50B may use one validation coupon 40 to validate each batch of multiple turbine discs 12. To this end, and as shown in FIG. 3, a unique identifier ($ID^A$), such as a 2-D matrix ID for example or other suitable conventional identifier, may be attached to or engraved in each validation coupon 40. Similarly, a unique identifier ($ID^A$), such as a 2-D matrix ID for example or other suitable conventional identifier, may be attached to or engraved in each part/turbine disc 12.

The input-output system 28 and/or the wEDM machine 20 and/or one or more of the stations $22^1$, $22^2$, $22^3$, $24^1$, $24^2$ . . . $24^n$ may be configured using conventional code reader technology for example. The unique ID's may be stored in the non-transitory memory 26B and may be received by the controller 26 at one or more of the steps of each given method described herein. The controller 26 may cross-reference the unique ID's ($ID^A$) and ($ID^B$) to maintain a unique matching between each given validation coupon 40 and the part(s)/turbine disc(s) 12 to be validated using the that validation coupon 40.

As an example, as can be seen from the above, in an aspect, the method 50B may be more efficient than prior art manufacturing and validation methods according to which otherwise good parts out of a given series of parts produced may have been destructed to validate the remaining parts in that series.

The present technology further provides various additional methods which may be practiced, for example, using one or more of the corresponding non-limiting embodiments of the system 10 to make and validate various parts. Some such methods do not require using the tool 34 described above.

For example, referring to FIGS. 1, 6 and 7-8, there is provided a method 60 of (wEDM) a feature, such as a cut-out, and wire electric discharge machining more particularly in some embodiments one or more of the slots 14, in a part, such as the turbine disc 12, with the feature having a given shape, such as the fir-tree shape in the case of the one or more of the slots 14, once the part is machined. The method 60 may be performed using the system 10, as described in detail next. While the method 60 is described herein with respect to wEDM fir-tree shaped cut-outs 14 in a turbine disc 12, in other embodiments and applications the method 60 may be used to define one or more other features and/or to make/validate other parts having such feature(s), including but not limited to compressor discs and integrally bladed rotors. As an example, one or more other features 14 need not be fir-tree shaped.

Figure 8:
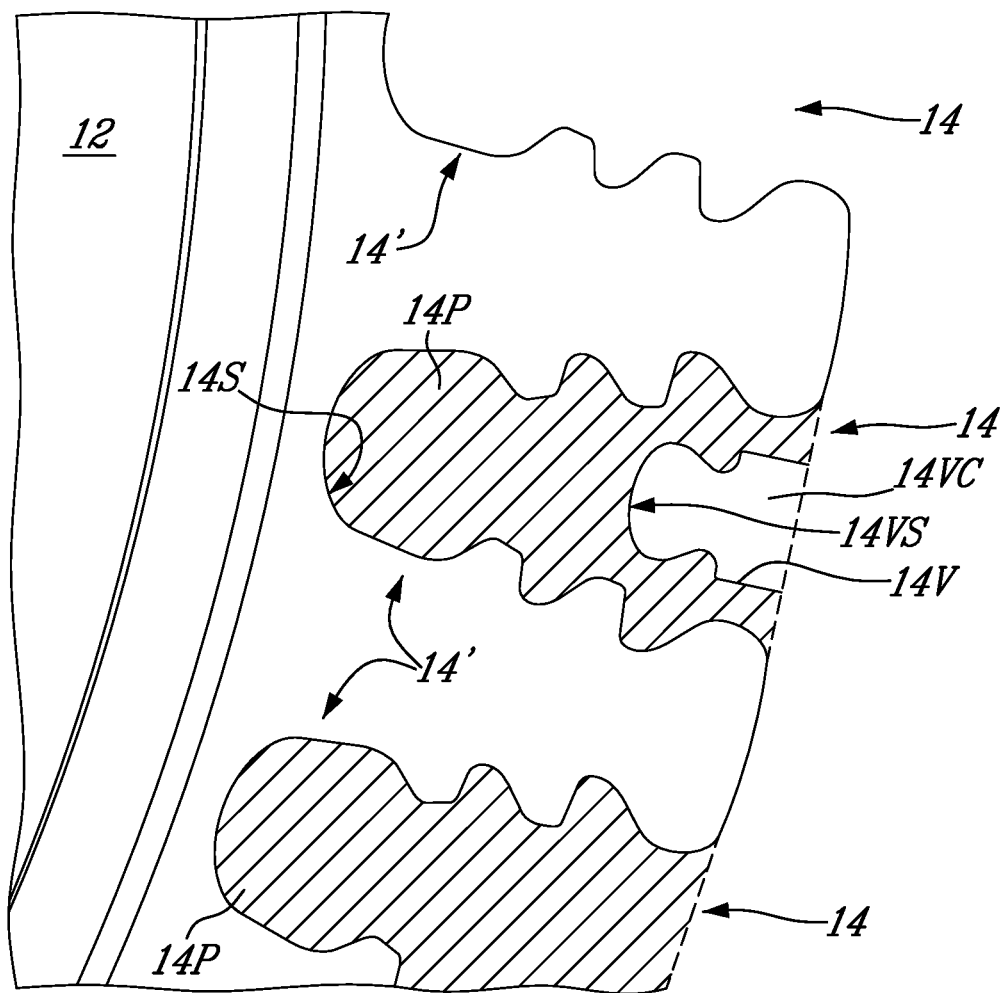
FIG. 8 is a plan view of one face of a turbine disc with slots machined therein using the system of FIG. 1, and with an outline of a validating machining path through the turbine disc as executed prior to machining at least a corresponding one of the slots.
Figure 9:
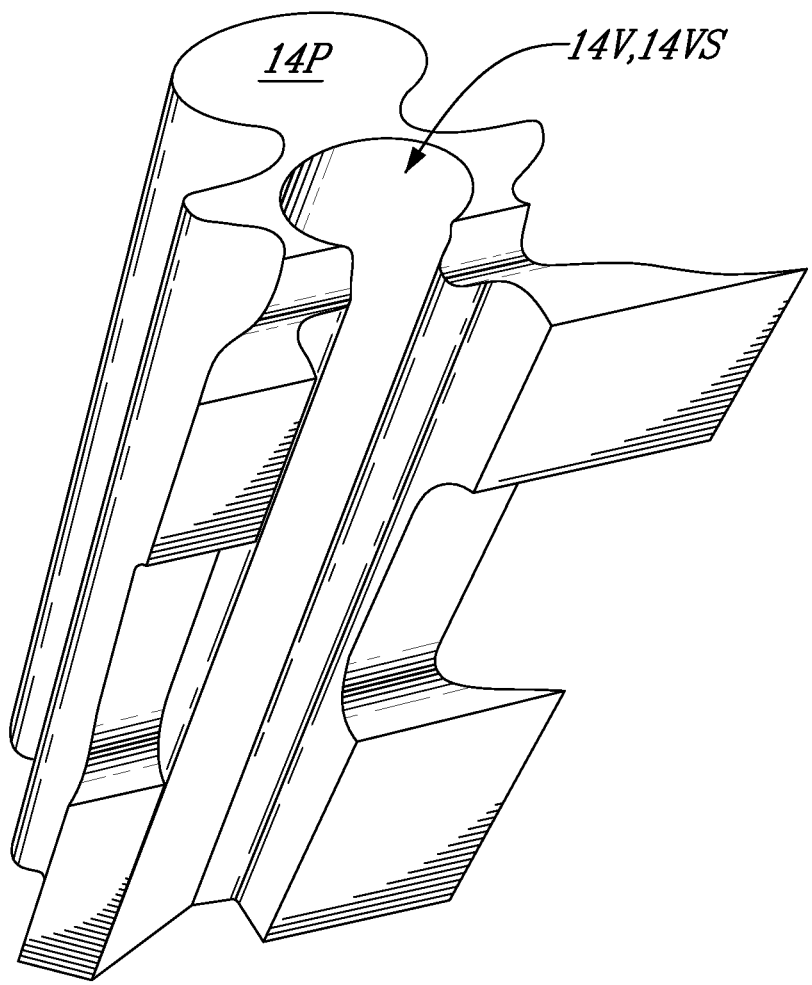
FIG. 9 is a perspective view of a validation coupon made using the validating machining path of FIG. 8.

Referring to FIGS. 6 and 8, in some embodiments, the method 60 includes a step 62 of, using wEDM, cutting and detaching a slug 14VC from a portion 14P of the part, such as the turbine disc 12, which portion 14P is to be detached from the part 12 to define a feature, such as a given one of the slots 14 to be machined in the turbine disc 12 in this example, and thereby defining a validation cut-out 14V in the portion 14P. As shown in FIG. 8, in this example, the validation cut-out 14V is fir-tree shaped, which helps provide an improved accuracy of validation of the feature 14/part 12. That said, other shapes of the validation cut-out 14V may also be used, and it at least some applications some such other shapes need not mimic a shape of the feature(s) 14 to be validated using the validation cut-out 14V.

The method 60 further includes a step 64 of, using wEDM, cutting and detaching the portion 14P having the validation cut-out 14V from the part 12 and thereby defining the feature 14. As seen in FIG. 8, in this embodiment, the portion 14P is cut by executing wEDM along the predetermined/desired shape of the feature 14, and more particularly along the fir-tree shape of the slot 14 in this non-limiting example. In the present example, the steps 62 and 64 are executed using the wEDM machine 20.

Referring to FIG. 8, upon completion of step 62, the validation cut-out 14V has a surface 14VS. In some embodiments of the method 60, the step 62 of cutting and detaching the slug 14VC includes executing a plurality of wEDM passes along the surface 14VS to give the surface a surface finish, such as a surface finish that a surface 14S of the feature 14 is to have. To this end, a plurality of wEDM passes may be executed to define the surface 14VS of the validation cut-out 14V, such as for example a roughing pass along the shape of the validation cut-out 14V to detach the slug 14VC followed by a finishing pass and a polishing pass along the surfaces 14VS created by the roughing pass.

In some embodiments, a set of wEDM cutting parameters, such as the set of wEDM cutting parameters 26B" (FIG. 1), may be used to execute the plurality of wEDM passes. An additional iteration of the plurality of wEDM passes may then be executed, for example using the set of wEDM cutting parameters 26", to perform step 64 and to thereby give the same surface finish to the surface 14S of the feature 14. In some embodiments, the set of wEDM cutting parameters 26" may be used to execute additional iteration of the plurality of wEDM passes to define multiple features 14 of the part 12, and in this embodiment all of the slots 14 for example, and to give the surface(s) of each of the features 14 the same surface finish.

The method 60 may allow to produce the detached portion 14P in a way that may allow to perform analysis, such as described with respect to step 55B of method 50B above, with respect to the detached portion 14P, and/or the validation cut-out 14V therein, as proxy(ies) for the feature(s) 14 of the part 12. That is, as shown at 66 in FIG. 6, the detached portion 14P having the validation cut-out 14V, and the validation cut-out 14V, may be analyzed to determine a set of characteristics and compare these to a threshold set of characteristics. The set of characteristics of the portion 14P and/or validation cut-out 14V may be indicative of the set of characteristics of the feature(s) 14 and/or the part 12, and hence may be used to determine whether or not the feature 14 and/or the part 12 are suitable for their intended application(s), such as described with respect to step 55B of method 50B above for example.

In some embodiments, the set of characteristics may be selected from conventional characteristics suitable for the particular application that the part 12 is to have. In some embodiments, the step 66 of determining the set of characteristics may include executing a cleaning process, for example using the cleaning station 22$^1$ of the system 10 of FIG. 1, with respect to the portion 14P of the part 12. In some embodiments, the step 66 of determining the set of characteristics may include analyzing the surface 14VS of the validation cut-out 14V after the step of executing the cleaning process. In some embodiments, the step 66 of determining the set of characteristics may include executing a metallurgical analysis process, such as using the metallurgical analysis station 22$^3$ of the system 10 of FIG. 1, with respect to the portion 14P of the part 12. As described above, in some embodiments, the metallurgical analysis process may include cutting the portion 14P of the part 12 into multiple parts and/or carrying out analyses with respect to the multiple parts. Such analyses may include detecting cracks and/or other surface imperfections and/or other anomalies that may have been introduced into the portion 14P by the wEDM machine 20. Depending on the particular application(s) that the part 12 is to have, the steps involved in and/or the set of characteristics may be different.

Once the set of characteristics is determined, the set of characteristics may be compared to a set of threshold characteristics associated with the part 12 and/or the feature(s) 14. The set of threshold characteristics may be selected, for example using conventional engineering methods, to suit the particular application(s) that the part 12 is to have. Where the determined set of characteristics meets the set of threshold characteristics associated with the part 12 and/or the feature(s) 14, the method 60 may proceed with a step 68 of designating the feature(s) 14 in the part 12, and/or the part 12, as acceptable, and else, designating the feature(s) 14 in the part 12, and/or the part 12 as unacceptable. As used herein, the term "acceptable" means acceptable/validated for the intended application(s), and the term "unacceptable" means unacceptable/not validated for the intended application(s). Where a given part 12 is found acceptable/is validated, the part 12 may be put into its intended use(s) and/or subjected to further post processing, for example using additional stations shown in FIG. 1, to ready the part 12 for its intended use(s). Where a given part 12 is found unacceptable/not validated, the part 12 may be discarded and or recycled for example.

Now referring to FIGS. 1 and 7, in a more particular embodiment, the present technology also provides a method 70 of defining a plurality of slots 14 in a turbine disc 12, the slots 14 being fir-tree shaped and having respective given locations 14' in the turbine disc 12. The method 70 may be performed using the system 10, as described in detail next. In some embodiments, the method 70 includes a step 72 of executing a roughing pass to define a fir-tree shaped validation cut-out 14V in the turbine disc 12 in the given location 14' of a given slot 14 of the slots 14, the validation cut-out 14V having a validation surface 14VS, and a step 74 of executing at least one additional pass along the validation surface 14VS to give the validation surface 14VS a surface finish.

The method 70 also includes a step 76 of wEDM the slots 14 in the turbine disc 12 in respective ones of the given locations 14' by executing respective iterations of the roughing pass with respect to the slots 14, the step of wEDM the slots 14 removing from the turbine disc 12 a portion 14P of the turbine disc 12 having the validation cut-out 14V. The method 70 also includes a step 78 of executing respective iterations of the at least one additional pass along surfaces 14S of the turbine disc 12 defining the slots 14 to give the surfaces 14S of the turbine disc 12 the surface finish. The method 70 may thus provide at least one portion 14P having a validation cut-out 14V and a validation surface 14VS that are representative of the slots 14 and their respective surfaces 14S. The portion 14P may then be analyzed and in some cases additionally processed according to steps 55B and 59B described above for example, to validate the turbine disc 12 and prepare it for use.

The above description is meant to be exemplary only, and one skilled in the art will recognize that changes may be made to the embodiments described without departing from the scope of the invention disclosed. For example, while the present methods and systems have been described with respect to wEDM, it is contemplated that they may be applied to other processes for creating cut-outs or other features in various parts.

As another example, while the methods may include analysis and post-analysis processing steps as described above, in some cases the analysis and post-analysis processing steps may be omitted. More particularly, in some cases the methods above may be used to make for example a part and a corresponding one or more validation coupons, which may then be provided to a third party for analysis and post-analysis processing steps.

As yet another example, while the turbine discs 12 described above are produced with three wEDM passes for each slot 14, a different number of machining passes and/or types of machining may be used for example depending on each particular application and/or embodiment of the turbine disc 12 and/or other part.

As yet another example, while the "mimicking" features of the tool 34 described above may provide advantages in some applications, such as for example improving a reliability of the associated validation methods, the "mimicking" features may be omitted in other embodiments.

As yet another example, positioning the validation coupons 40 into the respective given positions 14' of the respective cut-outs/slots 14 relative to the wEDM machine 20 as described above may provide advantages in some applications, such as for example improving a reliability of the associated validation methods, this step may be omitted in other embodiments of the methods.

As yet another example, in some embodiments the systems and methods described herein may be used to wEDM and/or validate features in parts other than turbine discs 12 of a gas turbine engine. For example, in some embodiments the systems and methods described herein may be used to wEDM and/or validate features, such as fir-tree slots, in compressor disc(s) of a gas turbine engine. In such embodiments, the turbine disc 12 is thus a compressor disc of a gas turbine engine.

Still other modifications which fall within the scope of the present invention will be apparent to those skilled in the art, in light of a review of this disclosure, and such modifications are intended to fall within the appended claims.

The invention claimed is:

1. A method of wire electric discharge machining (wEDM) a feature in a part, comprising:
   using wEDM, cutting and detaching a slug from a portion of the part that is to be detached from the part to define the feature, and thereby defining a validation cut-out in the portion; and
   using wEDM, cutting and detaching the portion having the validation cut-out from the part and thereby defining the feature,
   retaining both the slug and the portion once detached; and
   conducting a metallurgical analysis process on the slug and/or the portion.

2. The method of claim 1, wherein the feature is a fir-tree shaped slot, and the validation cut-out is fir-tree shaped.

3. The method of claim 1, wherein the validation cut-out has a surface, and the cutting and detaching the slug includes executing a plurality of wEDM passes along the surface to give the surface a surface finish.

4. The method of claim 3, comprising using wEDM, cutting a plurality of features in the part by executing respective additional iterations of the plurality of wEDM passes with respect to each of the features to give a surface of each of the features the surface finish of the surface of the validation cut-out, the feature being one of the features.

5. The method of claim 4, wherein the step of cutting and detaching the slug is executed using a wEDM machine and the step of cutting the features is executed using the wEDM machine.

6. The method of claim 4, wherein the plurality of wEDM passes executed to define the surface of the validation cut-out executed by the wEDM machine using a set of wEDM cutting parameters, and the respective additional iterations of the plurality of wEDM passes are executed using the set of wEDM cutting parameters.

7. The method of claim 6, comprising:
   determining a set of characteristics of a surface of the validation cut-out; and
   where the determined set of characteristics meets a set of threshold characteristics associated with the part, designating the feature in the part as acceptable, and else, designating the feature in the part as unacceptable.

8. The method of claim 7, wherein the step of determining the set of characteristics includes executing a cleaning process with respect to the portion of the part.

9. The method of claim 7, wherein the step of determining the set of characteristics includes analyzing the surface of the validation cut-out after the step of executing the cleaning process.

10. The method of claim 7, wherein the step of determining the set of characteristics includes executing the metallurgical analysis process with respect to the portion of the part.

11. The method of claim 10, wherein the metallurgical analysis process includes cutting the portion of the part into multiple parts.

12. A method of defining a plurality of slots in a turbine disc, the slots being fir-tree shaped and having respective given locations in the turbine disc, comprising, using a wEDM machine:
   executing a roughing pass to define a fir-tree shaped validation cut-out in the turbine disc in the given location of a given slot of the slots, the validation cut-out having a validation surface;
   executing at least one additional pass along the validation surface to give the validation surface a surface finish;
   wEDM the slots in the turbine disc in respective ones of the given locations by executing respective iterations of the roughing pass with respect to the slots, the step of wEDM the slots removing from the turbine disc a portion of the turbine disc having the validation cut-out;
   executing respective iterations of the at least one additional pass along surfaces of the turbine disc defining the slots to give the surfaces of the turbine disc the surface finish, and
   after a cleaning process followed by a chemical analysis have been completed with respect to the portion of the turbine disc having the validation cut-out, and in response to determining that the set of results of the chemical analysis meets a threshold set of chemical results associated with the portion of the turbine disc, executing a metallurgical analysis process with respect to the portion of the turbine disc.

13. The method of claim 12, comprising in response to determining that a set of results of the metallurgical analysis meets a threshold set of metallurgical results associated with the portion of the turbine disc, designating the turbine disc as acceptable for further processing.

14. A system for machining a plurality of slots in a turbine disc, the slots being fir-tree shaped and having respective given locations in the turbine disc, comprising:
   a wEDM machine configured to removably engage the turbine disc for wEDM features into the turbine disc; and
   a controller in communication with the wEDM machine, the controller comprising a processor and a non-transitory memory operatively connected to the processor, the non-transitory memory storing a technology file that includes therein wEDM parameters and processor-executable instructions in the non-transitory memory, the processor-executable instructions, when executed by the processor while the turbine disc is engaged to the wEDM machine, causing the processor to control the wEDM machine using the wEDM parameters to:
   execute a roughing pass to remove a portion of the turbine disc from the given location of a given slot of the slots to define a fir-tree shaped validation surface disposed inward of a fir-tree shape of the given slot;
   execute at least one additional pass along the fir-tree shaped validation surface to give the fir-tree shaped validation surface a surface finish; and machine the slots in the turbine disc in respective ones of the given locations of the slots by executing respective additional iterations of the roughing pass followed by respective additional iterations of the at least one additional pass, the step of the executing a given roughing pass of the respective additional iterations of the roughing pass removing from the turbine disc a portion of the turbine disc having the fir-tree shaped validation surface without altering the fir-tree shaped validation surface, and retaining the portion removed from the turbine disc for metallurgical analysis, and the step of the executing the respective additional iterations of the at least one additional pass giving surfaces of the turbine disc defining the slots the surface finish.

15. The system of claim 14, wherein the non-transitory memory stores therein a technology file that includes wEDM parameters, and the processor-executable instructions, when executed by the processor while the turbine disc is engaged to the wEDM machine, cause the processor to process the technology file to control the wEDM machine to execute all of: a) the roughing pass to remove the portion of the turbine disc, b) the at least one additional pass along the fir-tree shaped validation surface, c) the respective additional iterations of the roughing pass, and d) the respective additional iterations of the at least one additional pass.

16. The system of claim 15, wherein:

the wEDM parameters include: roughing pass parameters, and post-roughing pass parameters; and the processor-executable instructions, when executed by the processor while the turbine disc is engaged to the wEDM machine, cause the processor to process the technology file to control the wEDM machine to execute:

both steps a) and c) according to the roughing pass parameters, and both steps b) and d) according to the post-roughing pass parameters.

17. The system of claim 16, wherein the at least one additional pass includes a finishing pass and a polishing pass.

18. The system of claim 17, wherein the post-roughing pass parameters include finishing pass parameters and polishing pass parameters.

* * * * *